(12) United States Patent
Riegel et al.

(10) Patent No.: US 7,185,682 B2
(45) Date of Patent: Mar. 6, 2007

(54) FUEL FLANGE ASSEMBLY FOR A VEHICLE FUEL SYSTEM

(75) Inventors: Taylor Leslie Riegel, Berkley, MI (US); Stephen T. Kempfer, Canton, MI (US); Daven Chinubhai Bhavsar, Canton, MI (US); Jason Nicholas Schultz, Belleville, MI (US); Matthew Edward Wiethoff, Dexter, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 265 days.

(21) Appl. No.: 11/020,795

(22) Filed: Dec. 22, 2004

(65) Prior Publication Data

US 2006/0130926 A1  Jun. 22, 2006

(51) Int. Cl.
*B65B 1/04* (2006.01)
(52) U.S. Cl. .................... 141/97; 141/98; 141/301; 123/510
(58) Field of Classification Search .................. 141/83, 141/97, 98, 301; 123/509, 510; 220/86.2; 137/587–589
See application file for complete search history.

(56) References Cited

U.S. PATENT DOCUMENTS

| | | | |
|---|---|---|---|
| 5,642,718 A | 7/1997 | Nakai et al. | |
| 5,785,032 A | 7/1998 | Yamashita et al. | |
| 6,047,685 A | 4/2000 | Schelhas et al. | |
| 6,129,074 A | 10/2000 | Frank | |
| 6,168,713 B1 | 1/2001 | Sekine et al. | |
| 6,206,035 B1 | 3/2001 | Wehner et al. | |
| 6,216,671 B1 | 4/2001 | Sawert et al. | |
| 6,382,190 B1 | 5/2002 | Tanabe et al. | |
| 6,575,199 B1 | 6/2003 | Ueda et al. | |
| 6,612,621 B2 * | 9/2003 | Oberheide et al. | 285/252 |
| 6,634,389 B2 | 10/2003 | Noone et al. | |
| 6,679,227 B2 | 1/2004 | Sawert et al. | |
| 6,776,185 B2 | 8/2004 | Farrar et al. | |
| 6,959,727 B2 * | 11/2005 | Krishnamoorthy et al. | 137/588 |
| 2003/0101971 A1 | 6/2003 | Farrar et al. | |
| 2003/0131828 A1 | 7/2003 | Crary | |
| 2004/0000554 A1 * | 1/2004 | Griffin et al. | 220/304 |

FOREIGN PATENT DOCUMENTS

GB         2255554 A   * 11/1992

* cited by examiner

*Primary Examiner*—Timothy L. Maust
(74) *Attorney, Agent, or Firm*—Brinks Hofer Gilson & Lione

(57) ABSTRACT

A fuel flange assembly for a vehicle fuel system provides Electro Static Dissipation without an undue increase in cost or reduction in the durability of the tank components. The fuel flange assembly generally includes a fuel tube, a tank flange, and a pressure control device. The fuel tube is constructed of a conductive polymer and has an inlet and an outlet. The fuel tube includes a portion defining a housing positioned between the inlet and the outlet. The tank flange is constructed of a non-conductive polymer. The pressure control device is fitted within the housing and includes a conductive outer casing engaging the fuel tube and forming an electrical pathway.

23 Claims, 3 Drawing Sheets

FUEL FLANGE ASSEMBLY FOR A VEHICLE FUEL SYSTEM

FIELD OF THE INVENTION

The present invention relates generally to fuel supply systems for motor vehicles, and more particularly relates to a fuel flange assembly for closing off the fuel tank in such a fuel supply system.

BACKGROUND OF THE INVENTION

The fuel supply system of a vehicle typically includes a fuel tank and a fuel pump for providing fuel to the engine via a fuel supply line. In many designs, the fuel pump forms a portion of an in-tank fuel delivery module which includes a reservoir for collecting fluid from the tank for delivery to the engine. A fuel filter is typically connected to the fuel supply line for filtering fuel flowing to the engine from the fuel pump. The fuel filter may be an in-tank filter connected to the fuel delivery module, or may be separately located. A tank flange is used to seal an opening in the fuel tank that provides for placement of and access to the fuel delivery module. The tank flange also provides various pathways into and out of the tank for electrical fuel wiring, or other components/materials.

Recently, there has been a higher focus on Electro Static Dissipation (ESD) in such fuel supply systems. It is known that as gasoline flows through various components of the fuel supply system, such as the primary fuel pump and any auxiliary pump, the fuel filter, and various valving and tubing, there is the potential for static electricity to be generated in the various conductive components of the fuel supply system. To provide ESD, fuel supply systems electrically ground the components through electrical interconnection.

For example, some systems employ conductive fuel tubes which are constructed of a conductive polymer material. The fuel tank flange is also constructed of a conductive polymer and is connected to these conductive fuel tubes to provide an electrical pathway to ground. Unfortunately, the materials used to form such conductive tubing and the flange are more expensive and more brittle than the non-conductive polymers typically used. The brittleness of the flange in particular results in a reduction in the flange's ability to flex under strain or otherwise withstand certain forces, such as during a motor vehicle accident.

Accordingly, there exists a need to provide ESD for the fuel supply system of a motor vehicle, while at the same time reducing cost and improving the durability of the fuel supply system.

BRIEF SUMMARY OF THE INVENTION

One embodiment of the present invention provides a fuel flange assembly for a vehicle fuel system that provides Electro Static Dissipation without an undue increase in cost or reduction in the durability of the tank components. The fuel flange assembly generally includes a fuel tube, a tank flange, and a pressure control device. The fuel tube is constructed of a conductive polymer and has an inlet and an outlet. The fuel tube includes a portion defining a housing positioned between the inlet and the outlet. The tank flange is constructed of a non-conductive polymer. The tank flange has an aperture sized to receive a portion of the fuel tube, and the tank flange sealingly engages the fuel tube proximate the aperture. The pressure control device is fitted within the housing defined by the fuel tube. The pressure control device includes a conductive outer casing engaging the fuel tube and forming an electrical pathway.

According to more detailed aspects, the housing is integrally formed in the fuel tube. The housing includes retention members engaging the pressure control device, and a fluid seal is formed between the pressure control device and the fuel tube. The fluid seal preferably includes a gasket sealingly engaging both the pressure control device in the fuel tube.

Preferably, the tank flange is overmolded on to the fuel tube, although the tank flange may be welded to the fuel tube or the fuel tube may be press-fit into the tank flange, or the tank flange and fuel tube may include cooperating snap features for connection therebetween, with a gasket sealingly engaging both the tank flange in the fuel tube.

The pressure control device may take many forms, such as a flow through pressure regulation valve, a bypass pressure regulation valve, or a parallel pressure relief valve. The housing extends laterally from the fuel tube and defines an opening. The pressure control device is connected to the housing of the fuel tube by passing the valve through the opening. Fuel exiting the pressure control device passes out the opening. When the pressure control device includes a bypass, the housing includes a bypass opening. Return fuel exiting the bypass flows out the bypass opening. The fuel tube may define a second housing positioned between the inlet and the outlet, the second housing receiving a bypass member of the bypass. The housing and second housing extend laterally from the fuel tube and extend in different directions.

When the fuel tube and housing are structured for a parallel pressure relief valve, the fuel tube includes separately formed first and second portions. The first portion includes the inlet, while the second portion includes the outlet and is connected to the tank flange. The first portion defines a first housing portion and the second portion defines a second housing portion. The first housing portion and the second housing portion are connected together with the pressure relief valve positioned inside the housing. The first housing portion and the second housing portion are preferably welded together. The housing may further include a third housing formed separately from the fuel tube and containing at least one valve. The third housing portion is positioned between the first housing portion and the second housing portion. The first and second housing portions are each welded to the third housing portion, and all are constructed of a conductive polymer.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
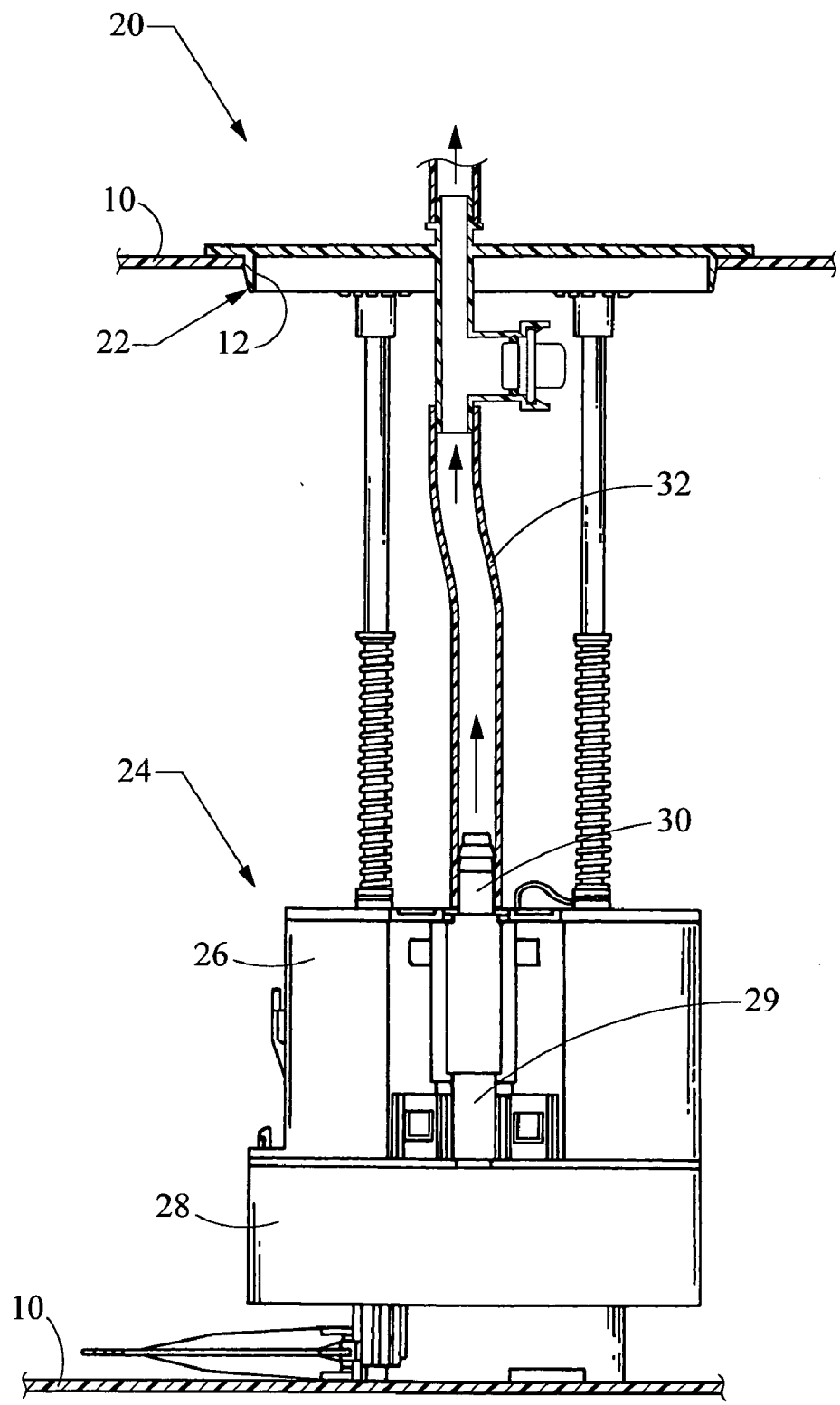
FIG. 1 depicts a front view of a fuel supply system having a fuel flange assembly constructed in accordance with the teachings of the present invention.

Turning now to the figures, FIG. 1 depicts a front view of a fuel supply system 20 having a fuel flange assembly 22 constructed in accordance with the teachings of the present invention. The fuel supply system 20 is constructed for use with a fuel tank 10 having an opening 12 through which a fuel delivery module 24 is positioned inside the tank 10. The fuel flange assembly 22 is attached to and can be considered to form a portion of the fuel delivery module 24, and is employed to close off the opening 12 in the fuel tank 10.

The fuel delivery module 24 generally includes a housing 26 defining a reservoir for storing a portion of the fuel contained within the tank 10. The fuel delivery module 24 and housing 26 also includes a fuel pump (not shown) and may include an auxiliary fuel pump feeding the reservoir, although the primary fuel pump may be separately located (inside or outside the tank 10) or separately attached to the module 24. The fuel delivery module 24 may also include a fuel filter 28 connected thereto, although the fuel filter 28 may be located separately from the fuel delivery module 24 and may be located outside the fuel tank 10. The fuel delivery module 24 includes an outlet 30 through which fuel is supplied for delivery to the cylinders of the vehicle's engine. The outlet 30 is formed as the upper end of a stand pipe 29, which in the depicted embodiment of the fuel delivery module 24 is connected to an outlet of the fuel filter 28.

The stand pipe 29 is constructed of either a metal or a conductive polymer, such that the metal components of the housing 26, the fuel filter 28, the primary and/or secondary fuel pumps and any other components of the fuel supply system 20 which may generate a static charge, may be electrically connected to the outlet 30. A hose 32 is used to fluidically connect the outlet 30 of the fuel delivery module 24 to the inlet 42 of a fuel tube 40 forming a portion of the fuel flange assembly 22. The hose 32 is preferably constructed of metal or a conductive polymer in order to provide an electrical pathway between the outlet 30 of the fuel delivery module 24 and the inlet 42 of the fuel tube 40 of the fuel flange assembly 22. It will be recognized by those skilled in the art that the connection between the conductive hose 32 and the fuel delivery module 24 and its components (i.e. primary and secondary fuel pumps, filter, valves, etc.) will be dependent upon the particular fuel delivery module 24 or other fuel supply design.

Figure 2:
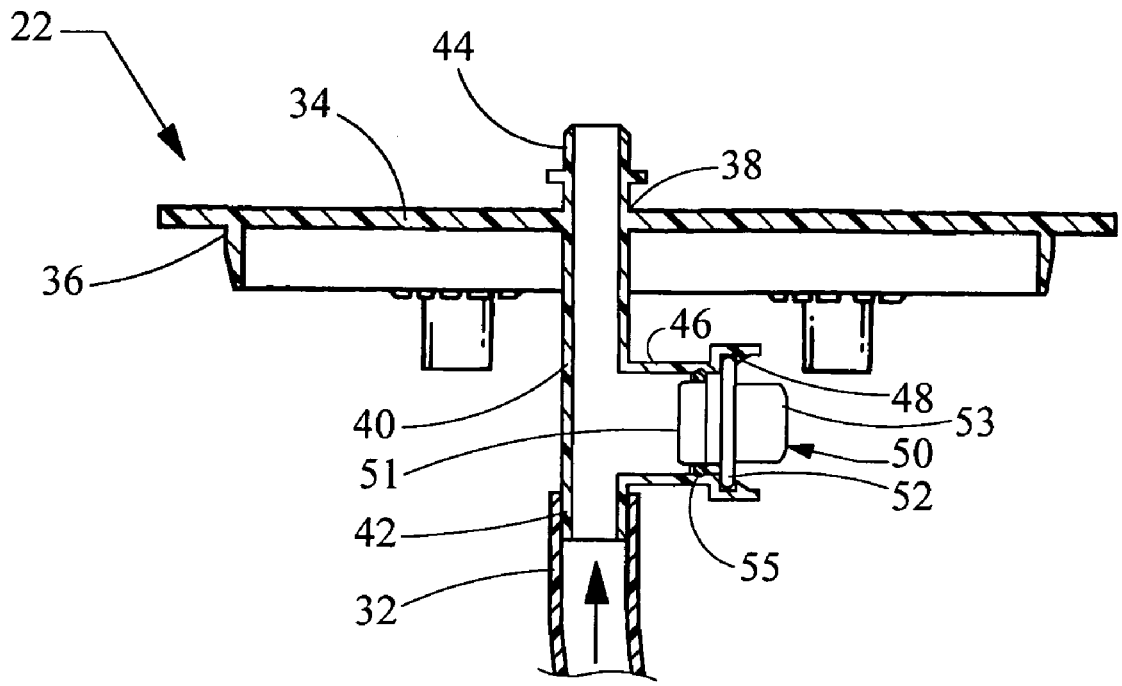
FIG. 2 is an enlarged cross-sectional view of the fuel flange assembly depicted in FIG. 1.

The fuel flange assembly 22 will now be described with reference to FIG. 2. The fuel flange assembly 22 generally includes a tank flange 34, a fuel tube 40, and a pressure control device 50. In the assembly, the fuel tube 40 is fitted to the tank flange 34, while the pressure control device 50 is fitted in the fuel tube 40. Generally, the tank flange 34 is constructed of a non-conductive polymer while the fuel tube is constructed of a conductive polymer, thereby providing an electrical pathway through the fuel flange assembly 22 and outside the tank 10, while at the same time providing a tank flange 34 that is ductile and well suited for the environment and potential conditions of the fuel tank 10 and fuel supply system 20, as will be described in more detail below.

The tank flange 34 is structured to define a shoulder 36 which is sized and positioned to engage the opening 12 defined in the fuel tank 10, and form a seal therebetween as is known in the art. The tank flange 34 is constructed of a typical polymer (i.e. Acetal, PFTE, PET, PVC) which is generally non-conductive. While typical conductive polymers (described below) are somewhat brittle, the use of standard polymers provide flexibility and durability to the tank flange 34, thereby allowing the flange 34 to flex, bend and adjust to the tank 10 and its opening 12 in all conditions. The tank flange 34 includes an opening or aperture 38 through which the fuel tube 40 is fitted.

Figure 4:
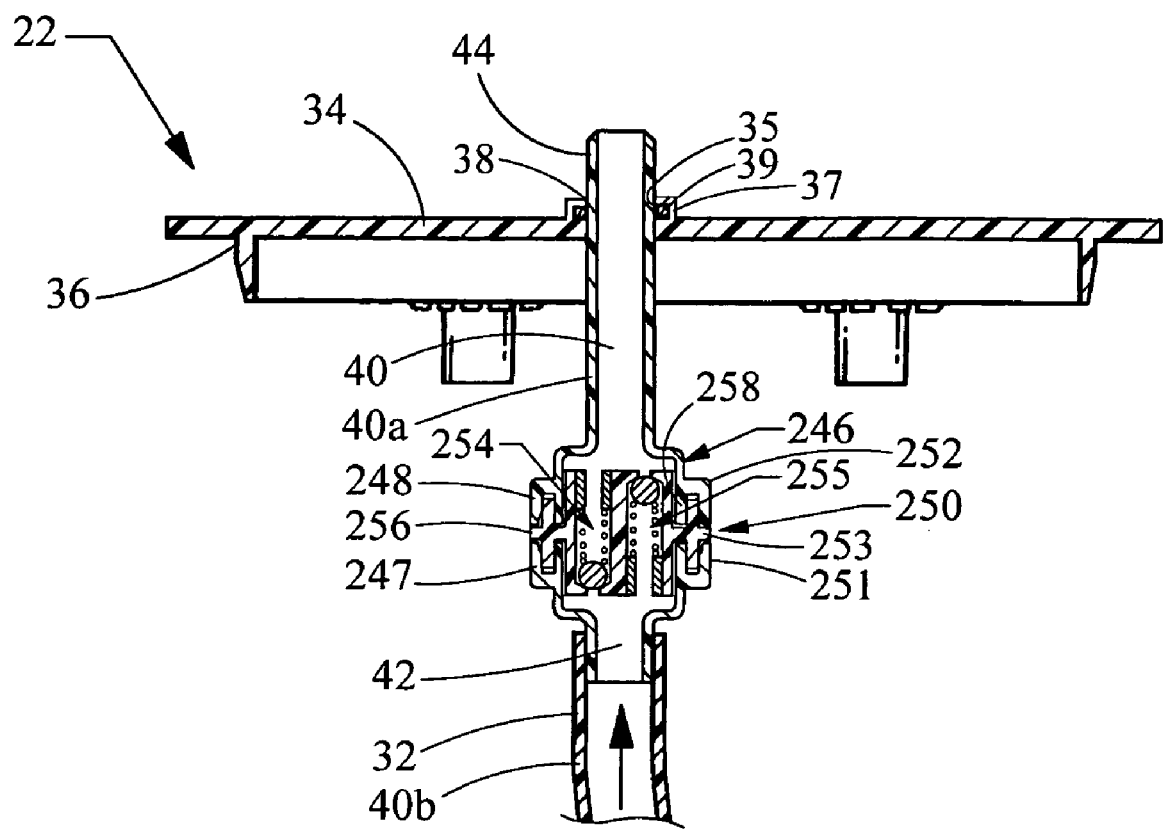
FIG. 4 is an enlarged cross-sectional view of yet another embodiment of a fuel flange assembly depicted in FIGS. 1 and 2.

The fuel tube 40 generally includes an inlet 42 and an outlet 44, and the tank flange 34 is positioned between the inlet 42 and outlet 44 such that the fuel tube 40 provides a fluidic path-through of the fuel flange assembly 22. The fuel tube 40 is fitted in the opening 38 of the tank flange 34, and preferably the tank flange 34 is overmolded onto the fuel tube 40. In this manner, the tank flange 34 is given shape and connected to the fuel tube 40 in a single procedure. Further, the overmolding process forms a seal between the tank flange 34 and fuel tube 40 to prevent any unwanted passage between the components. Although an overmolding technique is preferred, it will be recognized by those skilled in the art that the tank flange 34 may be welded to the fuel tube 40, such as by spin welding, vibration welding, ultrasonic welding or other known techniques. Similarly, the fuel tube 40 may be press fit into the tank flange 34 which would also create a seal between the components. Finally, and as shown in FIG. 4, the fuel tube 40 and tank flange 34 may include cooperating snap features 35 and a gasket 39 in order to connect and seal the two components 34, 40.

Turning back to FIG. 2, the fuel tube 40 is constructed of a conductive polymer for providing Electro Static Dissipation for the various components of the fuel delivery module 24 and particularly the pressure control device 50. A conductive polymer typically includes a polymer matrix provided with one of several fillers added to make it conductive (i.e. static dissipative). The polymer is preferably a standard acetal raw material, or even a nylon material such as nylon 11 or nylon 12, which can be provided with a filler to be sufficiently conductive to be static dissipative. Examples of fillers include carbon powder, carbon fiber, stainless steel fibers, and other metallic powders or fibers. The fuel tube 40, and in particular the portion existing outside the tank 10 and flange 34 may be connected to any electrical conductor providing a pathway to ground, such as a chassis mounted conductive line or other conductive component which provides a pathway to ground.

The tank flange 34 is preferably constructed of an acetal material as well, but without the conductive fillers. In this manner, the compatible polymer of both the tank flange 34 and fuel tube 40 promotes a strong bond during the overmolding process, or alternately the welding process if used.

The conductive fuel tube 40 also defines a housing 46 positioned between the inlet 42 and outlet 44. The housing 46 is sized and structured to receive the pressure control device 50. The pressure control device 50 will not be described in detail herein, but generally is used to relieve excess pressure in the fuel supply line by providing a return path to the fuel tank 10 for the excess fuel. As shown in the figure, the housing 46 includes a retention feature 48, which in the illustrated embodiment takes the form of a barb or tooth. One or more barbs 48 may be placed circumferentially around the inner periphery of the housing 46. The pressure control device 50 generally includes an outer casing defined by a first portion 51 and a second portion 53 which are crimped together to form a shoulder 52 defined in the outer casing. The barbs 48 are positioned the distance away from a shoulder 46a formed in the housing 46 to officially engage the shoulder 52 therebetween. Additionally, a gasket 55 may be placed in the housing 46 to form a seal between the first portion 51 of the casing and housing 46. The outer casing is metallic and engages the fuel tube 40, and particularly the housing 46 to form an electrical pathway for connection to ground and dissipating an electrical charge. It will be recognized by those skilled in the art that numerous other retention mechanisms may be readily employed in connection with the present invention including friction fits, deflectable tabs, snap rings, fasteners, lock mechanisms, spring loaded latches or the like.

The housing 46 defines an opening 47. In particular, the housing 46 extends laterally from the fuel tube 40 and defines the opening 47 at the distal end thereof. Fuel passing through the pressure control device 50 for discharge back into the fuel tank 10 thus passes through this opening 47. The opening 47 is also used to allow the pressure control device 50 to be placed through the opening 47 and into the housing 46 for retention by the barbs 48.

Figure 3:
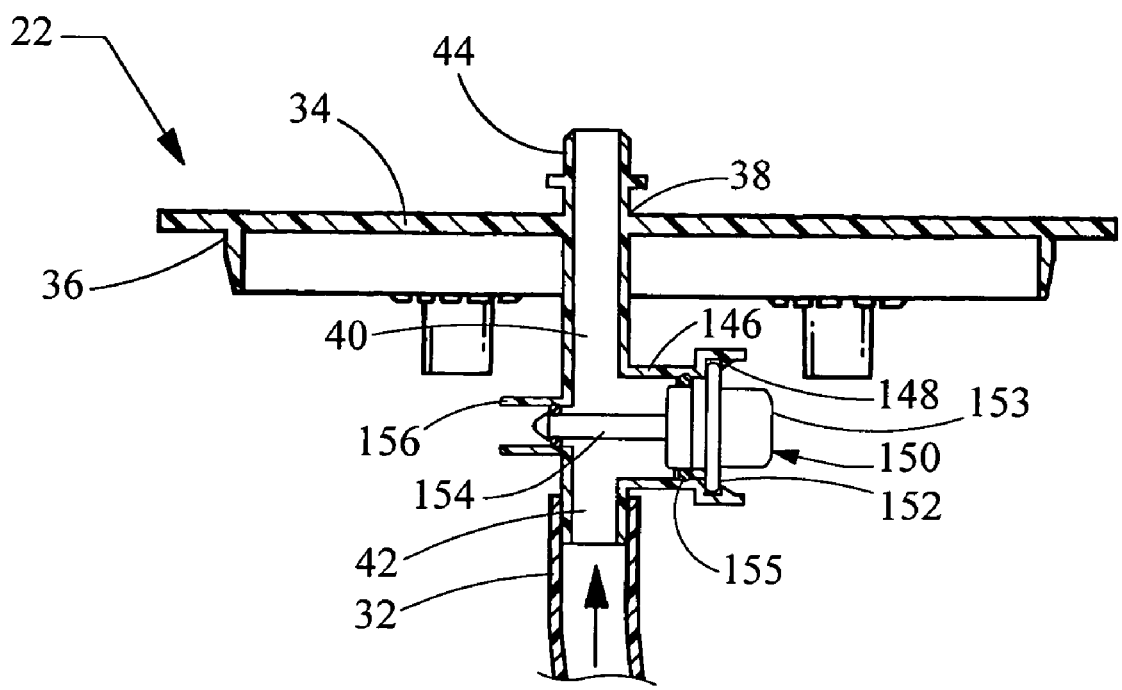
FIG. 3 is an enlarged cross-sectional view of an alternate embodiment of the fuel flange assembly depicted in FIGS. 1 and 2.

FIG. 3 shows an alternate embodiment of the tank flange assembly 22. In particular, the fuel flange assembly 22 and the fuel tube 40 have been designed to incorporate a pressure control device 150 which has a bypass. As shown, the pressure control device 150 includes a bypass member 154 projecting laterally from the first casing portion 151. Accordingly, the fuel tube 40, and in particular the housing 146 is supplemented with an additional housing 156 which is sized and structured to receive the bypass member 154. Both the housing 146 and the bypass housing 156 project laterally from the fuel tube 40 and in different directions. As with the primary housing 146, the bypass housing 156 includes an opening 158 through which fuel exiting the pressure control device 150 may exit back into the fuel tank 10.

Yet another embodiment of the fuel flange assembly 22 has been shown in FIG. 4. In this embodiment, the pressure control device 250 is a parallel pressure relief valve which includes one or more valve elements, depicted in FIG. 4 as two parallel valves 254, 255. The housing 246 is divided into a first housing portion 248 and a second housing portion 252. Due to the construction of the valve 250, the fuel tube 40 is formed in two parts, a first portion 40a including the inlet 42 and first housing portion 251. The second portion 40b of the fuel tube 40 includes the outlet 44 and the second housing portion 252. The second portion 40b of the fuel tube 40 is connected to the tank flange 34 in a manner as described above. The first housing portion 251 and the second housing portion 252 are connected together by way of a third housing portion 253. The third housing portion 253 contains the valves 254, 255 providing the pressure relief function. As shown, the third housing portion 253 includes a T-shaped flange 256 which corresponds with channels 258 formed in the first and second housing portions 251, 252, and through these features the three housing portions 251, 252, 253 may be connected together by way of welding or an adhesive. As the three housing portions 251, 252, 253 are all constructed of a conductive polymer as described above, the materials are compatible for bonding and provide a unified electrical pathway for dissipating electric charge through the fuel tube 40.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A fuel flange assembly for a vehicle fuel system for providing Electro Static Dissipation, the assembly comprising:
    a fuel tube constructed of a conductive polymer, the fuel tube having an inlet and an outlet, the fuel tube including a portion defining a housing positioned between the inlet and outlet;
    a tank flange constructed of a non-conductive polymer, the tank flange having an aperture sized to receive a portion of the fuel tube, the tank flange sealingly engaging the fuel tube proximate the aperture; and
    a pressure control device fitted within the housing defined by the fuel tube, the pressure control device including a conductive outer casing engaging the fuel tube and forming an electrical pathway capable of Electro Static Dissipation.

2. The assembly of claim 1, wherein the housing is integrally formed in the fuel tube.

3. The assembly of claim 1, wherein the housing of the fuel tube includes retention members engaging the pressure control device.

4. The assembly of claim 3, wherein the retention members engage a shoulder formed by the outer casing of the pressure control device.

5. The assembly of claim 1, wherein a fluid seal is formed between the pressure control device and the fuel tube.

6. The assembly of claim 5, wherein the fluid seal includes a gasket sealingly engaging both the pressure control device and the fuel tube.

7. The assembly of claim 1, wherein the tank flange is overmolded onto the fuel tube.

8. The assembly of claim 1, wherein the tank flange is welded to the fuel tube.

9. The assembly of claim 1, wherein the fuel tube is press-fit into the tank flange.

10. The assembly of claim 1, wherein the tank flange and fuel tube include cooperating snap features for connection therebetween, and further comprising a gasket sealingly engaging both the tank flange and the fuel tube.

11. The assembly of claim 1, wherein the pressure control device is a flow through pressure relief valve.

12. The assembly of claim 11, wherein the housing defined in the fuel tube extends laterally from the fuel tube and defines an opening.

13. The assembly of claim 12, wherein the pressure control device is connected to the housing of the fuel tube by passing the pressure control device through the opening.

14. The assembly of claim 12, wherein fuel exiting the pressure control device passes out the opening.

15. The assembly of claim 1, wherein the pressure control device includes a bypass.

16. The assembly of claim 15, wherein the housing includes a bypass opening, and wherein fuel exiting the bypass passes out the bypass opening.

17. The assembly of claim 15, wherein the fuel tube defines a second housing positioned between the inlet and outlet, the second housing receiving a bypass member of the bypass.

18. The assembly of claim 17, wherein the housing and second housing extend laterally from the fuel tube, and wherein the housing and second housing extend in different directions.

19. The assembly of claim 1, wherein the fuel tube includes a first portion and a second portion, the first and second portions being separately formed, the first portion including the inlet, the second portion including the outlet and being connected to the tank flange, the first portion defining a first housing portion and the second portion defining a second housing portion the housing being defined by the first and second housing portions.

20. The assembly of claim 19, wherein the first housing portion and the second housing portion are connected together with the pressure control device positioned inside the housing.

21. The assembly of claim 19, wherein the first housing portion and second housing portion are welded together.

22. The assembly of claim 19, wherein the conductive outer casing of the pressure control device is positioned between the first housing portion and the second housing portion.

23. The assembly of claim 22, wherein the conductive outer casing is constructed of a conductive polymer, and wherein the first and second housing portions are each welded to the conductive outer casing of the pressure control device.

* * * * *